(Model.)
W. H. GATES.
Artificial Tooth Crown.
No. 238,382. Patented March 1, 1881.
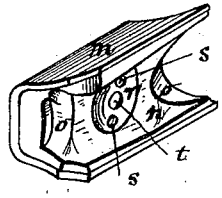
Fig. 1.
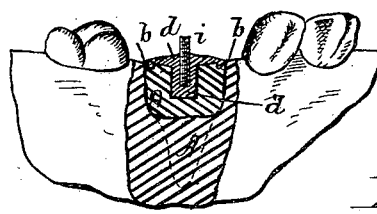
Fig. 2. Fig. 3.
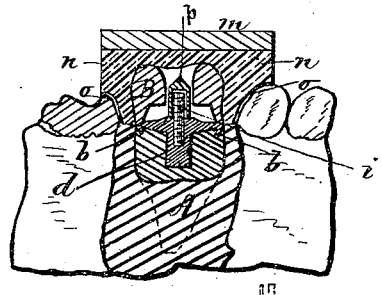
Fig. 4. Fig. 6.
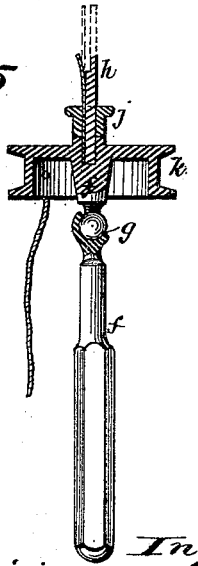
Fig. 5.
Witnesses.
F. L. Ourand
E. A. Dick
Inventor.
William H. Gates
by his attorney
M. Bailey

UNITED STATES PATENT OFFICE.

WILLIAM H. GATES, OF PHILADELPHIA, PENNSYLVANIA.

ARTIFICIAL TOOTH-CROWN.

SPECIFICATION forming part of Letters Patent No. 238,382, dated March 1, 1881.

Application filed October 18, 1880. (Model.)

*To all whom it may concern:*

Be it known that I, WILLIAM H. GATES, of Philadelphia, in the State of Pennsylvania, have invented certain new and useful Improvements in Artificial Tooth-Crowns and the method of and the means for mounting the same, of which the following is a specification.

My invention, which is an improvement on that described in my Letters Patent No. 164,913, has for its object to provide means for attaching artificial tooth-crowns to natural roots in a reliable, convenient, and artistic manner.

In the drawings accompanying this specification, Figure 1 is a view of the crown guide and holder, together with a sectional view of the amalgam-filled root and adjoining teeth from which it has been removed. Fig. 2 is a transverse vertical section through the root and crown and crown-guide. Fig. 3 is a longitudinal vertical central section of the same. Fig. 4 is a view, on enlarged scale, of the burr I employ in order to make the undercut grooves in the root. Fig. 5 is a sectional elevation of the post-holder. Fig. 6 represents, on enlarged scale, the preferred form of post.

In Figs. 2 and 3 I have omitted the amalgam filling in the coronal and basal portions of the crown for the sake of greater clearness.

The crown I employ (lettered B) is longitudinally hollow, the hollow being enlarged at the base, and having retaining pits or grooves $v$ not only in the basal portion, as expressed in said Letters Patent, but also in the walls of its coronal opening, and is also characterized by being provided with a body composed of amalgam, celluloid, or other equivalent compound, occupying said hollow, and completing said crown in conformity to the end of the natural root to which it is applied.

My invention consists not only in the crown, but in the method by which I produce it, and also in the means by which I attach the same to or mount it on the root.

To enable others skilled in the art to understand and use my invention, I shall now proceed to describe the manner in which the same is or may be carried into effect.

Having cut away the old crown beyond the free edge of the gum somewhat, especially at the border exposed to view, I enlarge the pulp-cavity in the root A to depth sufficient for a strong anchorage of amalgam, into which a suitable post may be embedded. Into the walls of this enlarged oval cavity—opposite in the long diameter—I then form shallow retaining-grooves $c$, Fig. 2, with the compound burr shown in side elevation on enlarged scale in Fig. 4, said burr being intended to be mounted in the hand-piece of any suitable dental engine. The cutting end of the burr is formed in several distinct annular toothed cutting ridges or ribs, $a$—three in number in the present instance. I also, with a small round burr, undercut a continuous groove, $b$, Fig. 2, in the face or end of the root, just within the cementum, for the purpose of securing a facing of amalgam, that, extending outward from the embedded post, may thus entirely cover the end of the root.

The root canal or canals having been previously filled, I insert the amalgam $d$ in the enlarged portion, after having thoroughly dried and varnished its walls with shellac, to prevent darkening. I now place on the root the new crown, (shown at B,) which has been approximately fitted to the root, and with a twist-drill of appropriate size passed through its hollow determine the position of and form the hole in the amalgam $d$ for what may be termed the "tap-screw post." This preferred form of post is shown in elevation and cross-section in Fig. 6 on an enlarged scale.

It consists of a steel pin, $i$, of small diameter and of the proper length, which, as shown, is screw-threaded, the thread being coarse, so that about four turns of the pin will cause it to enter the proper depth into the root-filling. It further has in opposite sides longitudinal flat faces or grooves $e$, which serve a double purpose, as hereinafter explained.

In sectional elevation in Fig. 5 is represented a post-holder adapted to insert the post into the filling of any root that from its position in the mouth cannot be entered in a direct line.

It consists of a divided handle, $f$, having its two parts connected by a ball-and-socket joint, $g$, the front part carrying expansible jaws $h$, which can be closed by means of a sliding sleeve, $j$, and being further provided with a peripherally-grooved disk or wheel, $k$, which is fixed to it.

The inserting operation is accomplished as follows: The post-hole having been formed in the root-filling, as described, the post (of proper length) is put between the jaws of the post-holder, and the sleeve is moved forward, so as to close the jaws on the post. A cord attached to the wheel $k$ is wound, say, four times in the proper direction around its grooved periphery. The holder is then taken in hand and the point of the post pressed into the post-hole, while with the other hand the cord is pulled. This will cause the rotation of the front portion of the handle, a consequent rotation of the screw-threaded post, and the four turns which it is caused to make will suffice to enter it the proper distance into the root-filling. The sleeve is then drawn back, the jaws released, and the holder removed, leaving the post in the filling.

It is obvious that for all roots approachable in a direct line this arrangement for rotating the front portion of the post-holder at any desired angle may be dispensed with, using a plain unjointed handle instead.

The grooves in the post allow the holder to take a firm grasp, (which is essential, inasmuch as the post cuts its own thread in the amalgam,) and also serve as channels to permit the escape of air from the bore entered by the advancing post, and which air, if forced along before the point of the post, might be pressed through the root-canal and produce periodontitis. The front end or point of the post should be sufficiently reduced in size to enter the bore as a tap-screw without clogging. When two posts are desirable for one crown, as in roots of molars, I select positions in opposite canals, and preferably set them inclining toward each other. After the post is inserted by the post-holder the crown should be tried on, as, while the amalgam is still soft, any error in position can easily be removed by forcing the free end of the post or posts to the desired place. The amalgam $d$ should then be firmly tamped around the post with suitable flat or curved instruments and then extended laterally, covering the end of the root to the margin, where, dipping into the undercut groove $b$, it exerts a binding influence to prevent the root from splitting, or, if two or three, from separating from each other. The end of the root is prepared concave—following the natural line of the gum—and an additional depression is made in the palatal and one in the buccal or labial margin of the end of the root; but the amalgam facing, made thick in the center around the post, changes the concave to an elevated or convex face thereat, and the lateral parts of the amalgam facing over said depression being afterward countersunk to form the anchor-pits $l$, Fig. 2, the completed face of the end of the root presents an uneven surface for the joint specially adapted to anchor firmly the crown that conforms thereto.

Proceeding, I place a particle of wax in the outer end of the hollow crown, which secures it temporarily to the post in proper position. I then, by a special impression-cup, embed it (preferably) in plaster, including part of an adjoining tooth on either side, the impressions of which on removal I trim to vertical section. This temporary casing with its lateral impression-guides has for its object to assure the convenient and accurate return of the crown to its desired position while in the process of forming its base. I therefore term it the "crown-guide."

The impression-cup which I prefer to employ is of metal, and of the form shown at $m$, in perspective, in Fig. 1, in transverse section in Fig. 2, and in longitudinal section in Fig. 3, with a thickened base in order to adapt it to withstand the taps or blows to which it may be subjected at that point. The plaster filling containing the artificial crown, and also the lateral impression-guides $o$, is lettered $n$.

When the plaster has set so as to hold the crown firmly, I fill the latter nearly full of amalgam, tamping it toward the walls only, and, placing a cap, $p$, (shown enlarged in section on the right of Fig. 2,) over the post or posts, to prevent engagement therewith, press the crown-guide to its place on the root. Its removal will bring away also the post-cap embedded in the amalgam in the crown. Adding and tamping more amalgam thereto, I reapply the crown, striking its guide light blows to cause the amalgam to receive a perfect impression of the face of the root, including the anchor-pits. This obtained, I loosen and withdraw the post-cap, try on the crown again, and then lay it aside for the amalgam to harden. At this stage the crown embedded in the plaster will appear as shown in Fig. 1, $r$ being the amalgam filling of the crown, $s$ the anchor-points or projections corresponding to the anchor-pits $l$ in the amalgam root-filling, and $t$ the central hole, from which the post-cap has been removed. An hour later, or any day thereafter, the crown may be secured permanently in its place. In the meantime I disengage it from the plaster, file away the amalgam that overlaps the impression of the root, and burr out the oval cavity in the center of the amalgam where the final filling is to engage the post. Finally, in securing the crown to the root, the base of the former may be soldered by mercury to the facing of the latter by simply varnishing their contiguous and conforming surfaces with mercury pressed through chamois at the end of a tube, and then filling the cavity around the post with amalgam; or, if preferred, a thin wafer of quite pure gutta-percha may be softened and then applied to the base of the crown by a wet cushion of sponge or soft rubber. This gutta-percha I reheat, after trimming it to conform to said base, and, guided by the anchor-points, (which are the counterparts of and enter the anchor-pits in the root,) I press it against the dried facing of the root. A filling, preferably of amalgam, inserted around the post and extended outward to occupy the coronal opening and its retaining-grooves $v$, completes the operation, and the crown is hermetically joined to the root; or a crown provided with a base of amalgam alone made to conform to a facing of amalgam on the end of the root may be quite firmly soldered thereto with mercury applied as above described. In that case the facing of the root may be provided with anchor-pits or other irregularities, of which the base of the crown will represent a counter-impression, for the purpose of steadying the crown in position until sufficient time has elapsed for the mercury to rearrange the particles of and solidly unite the amalgam surface of its base to the corresponding amalgam surface of the root-facing.

In setting front teeth I prefer celluloid to amalgam at the base of the crown, as the joint may be thereby quite concealed. In using celluloid I proceed as above described up to the point when the crown is seated in the crown-guide. Then, instead of amalgam, I insert modeling-composition in the crown, whereby, embedding the post-cap, I obtain a perfect impression of the end of the root. I then embed the case in an appropriate flask to the level of the impression, and into the post-cap insert a small pin, whose projecting end is incased with a short section—say half an inch—of rubber tubing. To obtain a strong counter-impression I pile up cement around this tubing with overhanging ledges that will engage the plaster that completes the flask. Upon reopening the flask, which I preliminarily warm up, I replace the modeling-composition, post-cap, and tubing with celluloid, which is, by the usual process, made to conform to the cement counter-impression, the excess of celluloid entering and filling more or less of the vent-hole left in cement counter-impression after the removal therefrom of the rubber tubing. Thus is produced a crown with a solid celluloid interior, having on its base the impression of the root, with a projecting central pin formed by excess of celluloid drawn preferably in that direction. This pin I cut away, drill in its line through the crown, make the oval enlargement within, as in the amalgam previously described, and secure the crown to the root, after attaching it with the film of gutta-percha in the same manner.

While I prefer to use amalgam or celluloid in carrying my invention into effect, it is manifest that other substances—such, for instance, as hard rubber or vulcanite—might be employed.

With respect to the impression-cup I would remark I am aware that cups or holders for containing an impression material have before been used in dentistry, and I do not claim such a cup, broadly, my claim being restricted in that respect to the short saddle-like impression-cup constructed as shown in the drawings.

Having now described my invention, and the manner in which the same is or may be carried into effect, what I claim, and desire to secure by Letters Patent, is—

1. The method of mounting artificial tooth-crowns on roots, consisting in first forming the crown with an amalgam, celluloid, or equivalent base, molded to accurately fit the surface of the root, and then putting the crown and root together and uniting them by one or more posts embedded in and held by amalgam or other suitable binding composition filled into the crown and root, substantially as hereinbefore set forth.

2. The improvement in the art of mounting artificial tooth-crowns on roots, consisting in filling the root with amalgam or its equivalent, embedding a retaining-post therein, fitting a hollow crown containing amalgam or its equivalent to the root, so that it shall have a surface the counterpart of the surface of the root and root-filling to which it is applied, and then uniting said crown and root by amalgam or other suitable binding composition filled into the crown around the root-post projecting therein, substantially as hereinbefore set forth.

3. In a process of mounting artificial tooth-crowns on roots, in which the crown, before being permanently attached to the root, is first provided with an amalgam base, molded to accurately fit the amalgam face of the root, the method of uniting the amalgam bodies of the root and crown at the time the crown and root are permanently fastened together by means of mercury applied to the contiguous faces of said amalgam bodies, substantially as before set forth.

4. In a process of mounting artificial tooth-crowns on roots, in which the crown, before being permanently attached to the root, is first provided with an amalgam or equivalent base, molded to accurately fit the surface of the root and its filling, forming anchor pits or depressions in the one part and corresponding anchor points or projections on the other part, substantially as and for the purposes hereinbefore set forth.

5. The post consisting of a screw-threaded pin formed with longitudinal grooves, as and for the purposes hereinbefore set forth.

6. The tooth-crown formed or provided at its base with a molded amalgam, celluloid, or other equivalent face to fit the surface of the root to which said crown is to be applied, substantially as set forth.

7. A longitudinally-hollow all-porcelain tooth-crown provided in the walls of its basal portion, and also of its coronal opening, with retaining grooves or pits, substantially as hereinbefore set forth.

8. The metallic impression-cup $m$, open at both ends, and formed and provided with a thickened base, as and for the purposes shown and set forth.

In testimony whereof I have hereunto set my hand this 24th day of September, 1880.

W. H. GATES.

Witnesses:
JAMES S. PHILLIPS,
JOS. R. TINDALL.